United States Patent Office 3,497,733
Patented Feb. 24, 1970

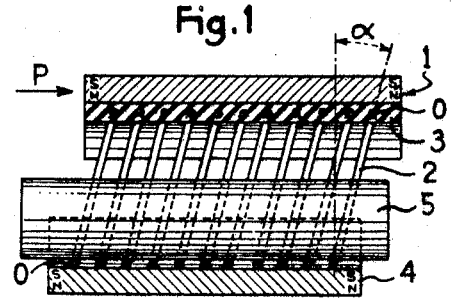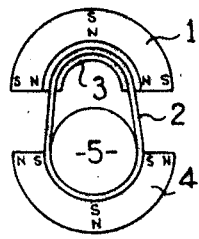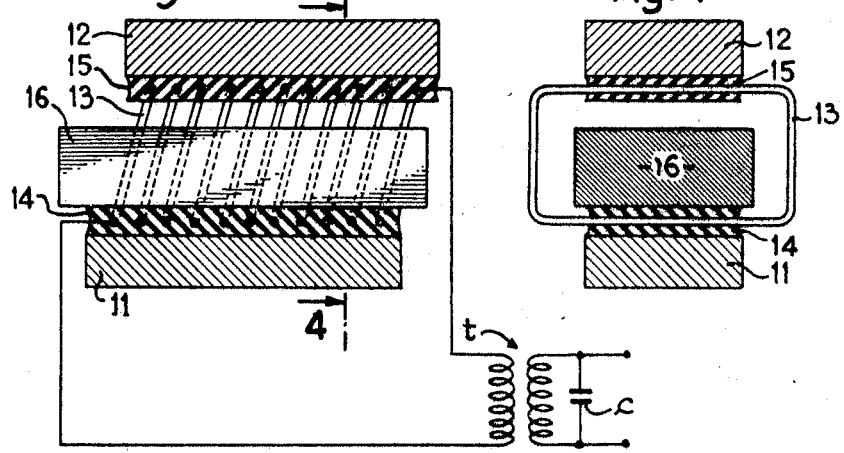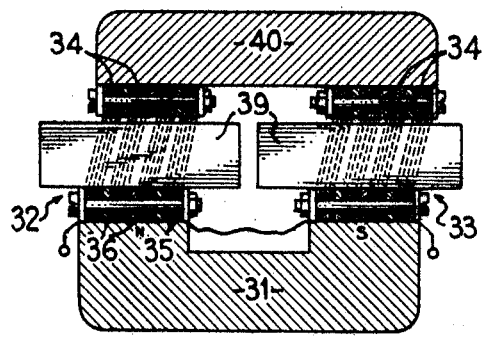

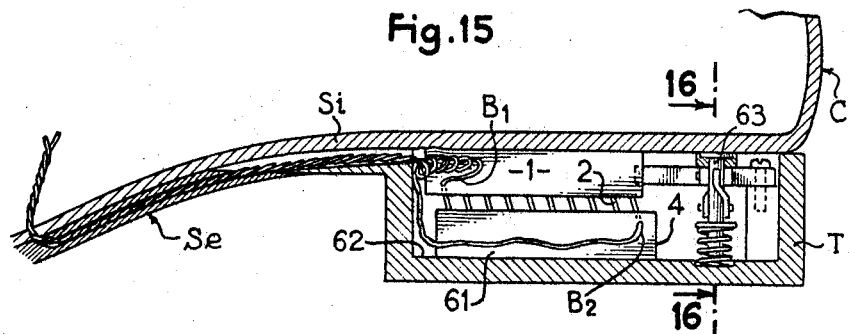
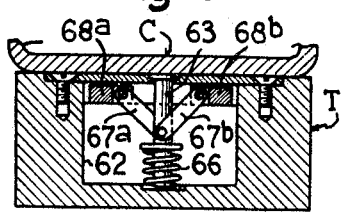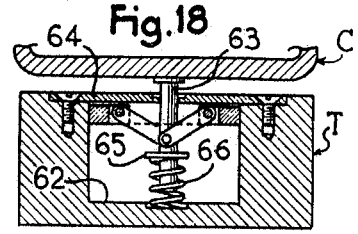
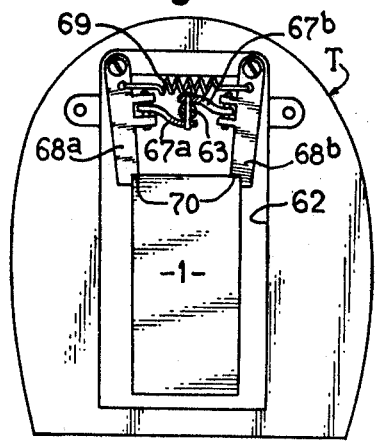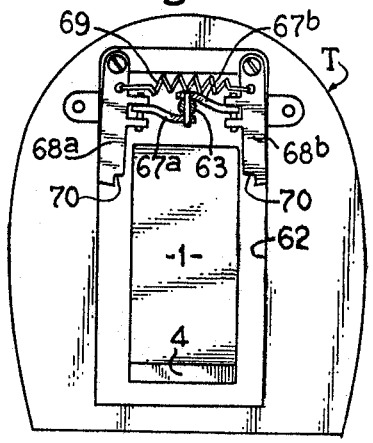

3,497,733
ELECTRIC GENERATOR
Jean Louis Marie Girerd, 27 Bis Quai Anatole, 75 Paris, France; Ala El Dine Abdellatif, 35 Rue Du Mont Valerien, 92 Saint-Cloud, France; and Robert Pierre Bousson, 1 Rue Gaston Boissier, 75 Paris, France
Filed Dec. 19, 1967, Ser. No. 691,768
Claims priority, application France, Dec. 26, 1966, 88,812; June 28, 1967, 112,192
Int. Cl. H02k 35/04
U.S. Cl. 310—15                  14 Claims

ABSTRACT OF THE DISCLOSURE

An electric generator comprising at least one permanent magnet and a solenoid in the form of an elastically yieldable element located in the field created by said magnet.

---

The present invention relates to an electric generator for producing electric energy from a mechanical energy which is applied discontinuously.

The electric generator according to the invention is of the type comprising at least one permanent magnet and a solenoid, said solenoid being an elastic element placed in the field created by said magnet.

Such a generator is therefore obtained by combining the mechanical properties of a spring having a stiffness K and the magnetic properties of said spring employed as a solenoid placed in the field H of a permanent magnet. The deformations of such a spring caused by the mechanical action are such that a variation in the magnetic flux traversing the turns of the spring is achieved which generates in said solenoid an induced electromagnetic force whose magnitude is proportional to the derivative of the flux with respect to time in accordance with the formula $$e = K \frac{d\phi}{dt} \text{ volts}$$

wherein the flux $\phi = BS$ and the induction $B = \mu H$, S being the area of the section of the solenoid and H the magnitude of the field.

Further features and advantages of the invention will be apparent from the ensuing description with reference to the accompanying drawings.

Figure 10:
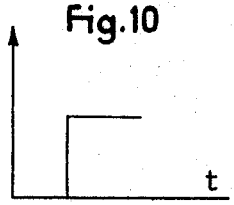
Figure 11:
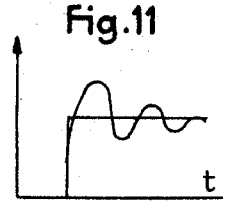
Figure 12:
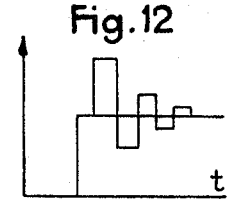
Figure 13:
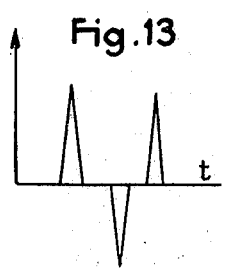
Figure 14:
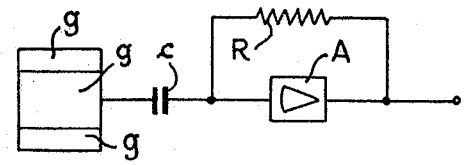
Figure 20:
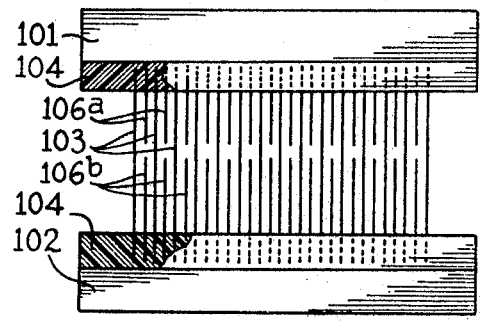
Figure 21:
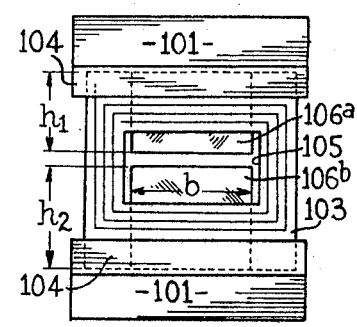
Figure 22:
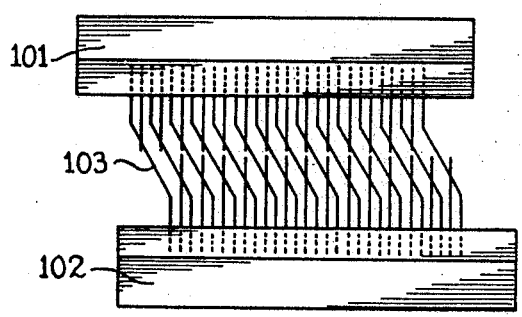
Figure 23:
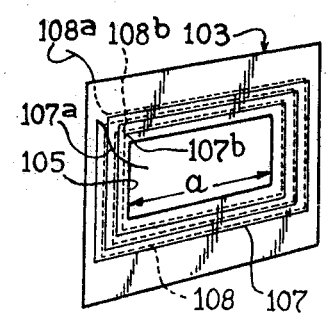
Figure 24:
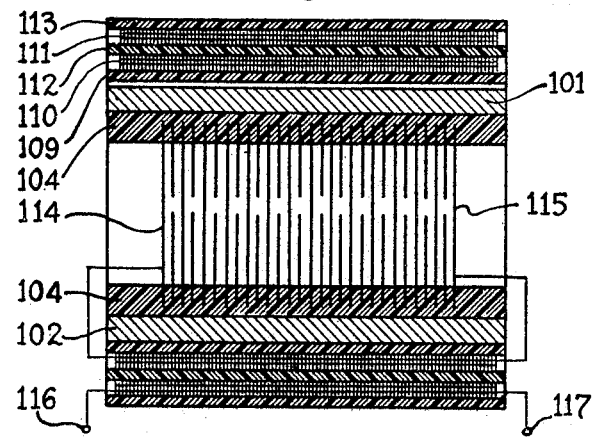

In the drawings:
FIGS. 1, 3, 5, 6 and 8 show respectively five embodiments of the generator according to the invention;
FIGS. 2, 4, 7 and 9 are side elevational views of the generators shown in FIGS. 1, 3, 6 and 8 respectively;
FIGS. 10 and 11 are diagrams illustrating the operation of said generators;
FIGS. 12 and 13 are diagrams illustrating the operation of the device shown in FIG. 14;
FIG. 14 is a diagram of a pulse generator according to the invention;
FIG. 15 is a sectional view of a shoe showing an application of an electric generator according to the invention;
FIGS. 16–19 are views illustrating the operation of the generator shown in FIG. 15;
FIG. 20 is a longitudinal elevational view of the generator according to another embodiment of the invention;
FIG. 21 is a side elevational view of the embodiment shown in FIG. 20;
FIG. 22 shows the generator shown in FIG. 20 in its armed position;
FIG. 23 is a perspective view of one of the plates constituting the solenoid of the generator shown in FIG. 20; and
FIG. 24 is a longitudinal elevational view of a generator provided with a step-up transformer.

The electric generator shown in FIGS. 1 and 2 comprises a semicylindrical magnet 1 having a north pole along the inner generatrices and a south pole along the outer generatrices. Secured to said magnet is a spring 2 which is insulated by means of an insulator 3 adhered to the inner surface of the latter. The spring 2, termed "self-induction spring," constitutes a solenoid having a roughly oval section.

A second semicylindrical magnet 4, the base of the right cylinder (1, 4) thus formed being of any shape such as circular, is secured to the spring 2 by means of a soft iron core 5 having a circular section, so that the spring 2 is electrically insulated from these two elements.

This magnet has such polarities that the inner surface constitutes south poles and the outer surface north poles.

The soft iron increases the permeability of the medium between the two magnets and consequently the magnetic flux therethrough.

The magnets can be produced in an appropriate manner. The insulator 3 can be for example of rubber which allows the wire of the spring a degree of freedom while ensuring the electric insulation with respect to the magnets. It will be understood that, if the latter are themselves electric insulators, for example if they are of ferrite, the insulator 3 can be omitted and the spring is then secured to the magnets by any suitable means. The spring can be an alloy of bronze and beryllium for example.

When a mechanical pulse is given to the magnet 1 (see FIG. 10), in the direction of arrow p for example or in the opposite direction, the magnet 1 undergoes a movement of translation relative to the magnet 4. This corresponds to a horizontal displacement (FIG. 1) of length $x$. The spring tends to return the magnet 1 to its initial position.

The turns of the spring thus become inclined in accordance with a variable angle $\alpha$ relative to the plane perpendicular to the axis of the spring 2 so that the flux $\phi$ traversing each turn is:

$$\phi_s = \mu H S \sin \alpha$$

wherein:

$\phi_s$ = the flux traversing the turn.
$\mu$ = coefficient of permeability of the medium between the two magnets.
H = the magnitude of the field.
S = the area of the turn.
$\alpha$ = the angle of deviation.

Therefore, the more the spring is stressed, the greater the flux traversing each turn.

After each pulse applied to the generator, there is obtained a damped oscillating system having a given frequency of oscillation for a mechanical disturbance, of the form shown in FIG. 10, the response to this disturbance being in the form shown in FIG. 11.

The mechanical oscillation creates in the spring, which forms a solenoid, an electric oscillation whose frequency is equal to the frequency of the mechanical oscillation, this frequency depending in particular on the angle $\alpha$.

A damped alternating voltage according to the above-mentioned formula is thus produced.

FIGS. 3 and 4 show a second embodiment of the invention in which the magnets 11 and 12 have a rectangular section. A spring 13 is secured to the magnets 11 and 12 by means of two insulating strips 14 and 15 in which the turns of the spring are partially embedded and which are fixed to the magnets. A soft-iron core 16 is fixed to the strip 15.

In this embodiment, the ends of the spring 13 are connected to a transformer $t$ whose secondary winding is shunt connected to a capacitor $c$. This arrangement thus forms a circuit tuned to the frequency of oscillation of the mechanical system, which permits increasing the amplitude of the output voltage.

Figure 5:
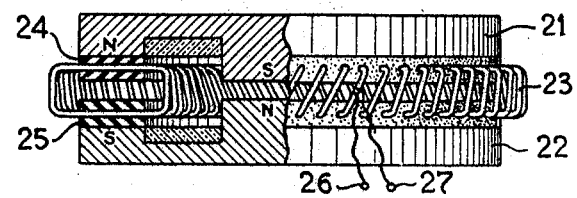

FIG. 5 shows a third embodiment of the generator according to the invention in which the permanent magnets 21 and 22 are circular and have polarities such as those shown for example. The spring 23 is toric with a rectangular cross-section and is embedded by the large sides of its turns in two insulating rings 24 and 25. The spring can be deformed by turning the two magnets relative to each other about the axis of the assembly and this modifies the flux which traverses each turn of the spring. The output voltage is received at the two terminals 26 and 27 for example.

FIGS. 6 and 7 show a fourth embodiment; the generator shown in these figures comprises a permanent magnet 31 having the polarity such as that shown in these figures for example. Fixed to the poles of said magnet are two batches of laminations 32 and 33. Each of these batches has a plurality of stacks 34 of four elastically yieldable conductive laminations 35 which are separated by laminations of insulating material 36.

The conductive laminations 35 are cut from rectangular elastically yieldable metal sheets and include an opening 37 (FIG. 7). One of the edges 38 of each lamination thus constructed, is cut.

The stacks 34 thus form a series of turns which are interconnected so as to form a solenoid. In the illustrated embodiment, two solenoids having four turns are provided, which are series connected in a suitable manner by connections (not shown).

A core having soft iron laminations 39 is mounted in each solenoid. The magnetic circuit of this generator is closed by a soft iron element or frame 40.

The stacks of laminations 34 are deformable as shown in FIG. 6 so that a mechanical pulse applied to the element 40 oscillates the latter relative to the magnet. In this way, the turns of the solenoid surround a variable flux which produces a voltage at the terminals of the generator.

Figure 8:
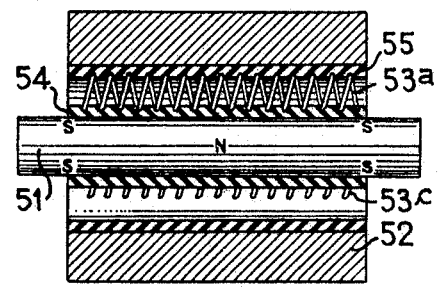
Figure 9:
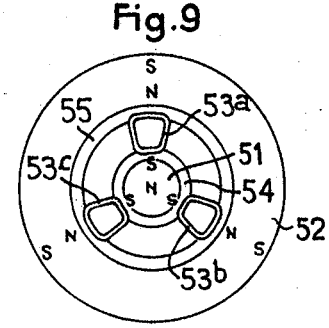

FIGS. 8 and 9 show another embodiment comprising two coaxial cylindrical magnets 51 and 52. The inner magnet 51 has for example a south pole along its generatrices and a north pole inside. The magnet 52 has a north pole along its inner generatrices and a south pole along its outer generatrices. An annular magnetic field is thus created between the magnets 51 and 52 whose direction is perpendicular to the axis of the assembly.

Springs 53a, 53b and 53c are fixed in two insulating sleeves 54a and 54b which are respectively fixed to the outer face of the magnet 51 and the inner face of the magnet 52. These springs can be for example series connected. An output voltage can be generated by vibrating the magnet 51 longitudinally in the magnet 52 or vice versa.

It is possible to obtain a non-sinusoidal voltage at the terminals of these generators by appropriately selecting parameters of the spring or springs. The voltage can then have the shape indicated in FIG. 12 for example. Such a shape of the voltage can be of utility if it is desired to obtain pulses having very steep slopes (FIG. 13), these pulses being employed, for example, for producing sparks. For this purpose, a derivative circuit having resistance and capacitance can be provided for example.

FIG. 14 shows a diagram of the principle of a derivative circuit for producing relatively high-amplitude pulses. One or more generators G according to the invention which are, for example, series connected, feed through a capacitor $c$ the input of an amplifier A which is shunt connected to a resistor R. The output pulses appear at terminal B.

FIGS. 15-19 show an application of a generator according to the invention, this generator being that shown in FIGS. 1 and 2.

FIG. 15 shows a part of a shoe C which comprises an inner sole $S_i$, and outer sole $S_e$ and a hollow heel T. The latter is movable relative to the inner sole $S_i$ owing to the flexibility of the outer sole $S_e$. Thus, when a person wearing this shoe starts to raise his foot to make a step, for example, the heel T moves away from the inner sole $S_i$, whereas when the person puts his foot back onto the ground, the heel T and the sole $S_i$ move together and come in contact with each other.

A generator 61, as that shown in FIG. 1, is housed in the cavity 62 of the heel T, the magnet 4 being fixed to the bottom of the cavity. In the position shown in FIG. 15, the sole $S_i$ completely closes the cavity 62 of the heel and bears against the upper face of the magnet 1 so that the generator is in the "loaded" state, the spring 2 being stressed.

A vertical pin 63 is mounted in the cavity 62 by means of a strip 64 fixed to the heel, and a plate 65 is rigid with the pin and retains a spring 66 which bears against the bottom of the heel. The pin 63 is vertically slidable under the effect of the spring 66. Two links 67a and 67b pivoted to the pin 63 are connected to two levers 68a and 68b pivoted to the heel. A return spring 69 interconnects these two levers. The latter have shoulders 70 which are capable of bearing against two edges of the magnet 1 (FIG. 17) when the levers are in the position in which they are closest together.

This generator operates in the following manner:

When the person wearing the shoe C raises his foot, the pin 63 is urged upwardly by the spring 66 and moves the levers 68a and 68b apart through the links 67a and 67b. As the magnet 1 is thus released, the spring 2 vibrates the latter so that an alternating voltage is generated at the terminals $B_1$ and $B_2$ of the generator. This voltage can be applied for example to a device charging a battery supplying an apparatus which is carried by the person and requires electric energy for its operation. Such an apparatus can be, for example, an apparatus for cardiac regulation or a hearing aid.

When the person puts his foot back onto the ground, the pin 63 is urged downwardly and the levers 68a, 68b lock the magnet in its initial position. Thus an alternating voltage is generated at each step taken by the person.

Many other applications can be contemplated for the generators according to the invention. For example, the generator can be employed in cooperation with a chemical battery for charging the latter by means of mechanical pulses applied to the generator.

The generator can be employed for setting off an explosion of a combustible mixture by means of a spark generated by the generator.

Such a generator can be incorporated in a link of a chain securing a buoy on which the shocks due to the waves are partially transmitted to the generator. The latter can then charge a battery supplying a transmitter for giving the bearings of the buoy for example.

It can be employed for counting the mechanical shocks undergone by a machine part in operation, the generator being placed in such position as to be in mechanical relation to this part.

FIGS. 20-23 show an electric generator according to another embodiment of the invention.

This electric generator comprises a fixed permanent magnet 101 and a movable permanent magnet 102 which produce a magnetic field in the space defined thereby. They are mechanically interconnected by a series of rectangular plates 103 having two opposed edges secured in tongue portions 104 of plastics material which are adhered to the magnets 101 and 102 respectively.

The plates 103 are of an insulating material, for example a plastics material, which is elastically bendable. The centre part of each plate has an opening 105 (FIGS. 21 and 23). Soft iron plates 106a, 106b are also inserted in the tongue portions 104 and are in alternating relation in pairs with the plates 103. These plates 106a, 106b reinforce the magnetic field between the two magnets and their width $b$ is slightly less than the width $a$ of the openings 105.

Provided around the opening 105 and on both sides of each plate 103, are conductors 107 and 108 (FIG. 23) which are printed thereon by one of the methods well-known in the printed circuit art.

The conductors 107 and 108 constitute turns wound in the same direction so that all the turns of the series of plates 103 constitute an uninterrupted solenoid the spirals of which are interconnected in series.

Thus the free end 107a of the conductor 107 constitutes the input terminal of the illustrated plate 103 and the free end 108a of the conductor 108 the output terminal of this plate.

The other two ends 107b and 108b are interconnected through an aperture in the plate.

Although FIG. 23 shows only three turns for each of the conductors 107 and 108, it will be understood that this number is not limitative. On the contrary, bearing in mind the fine workmanship possible in the printed circuit art, the number of turns per plate can be very high.

FIG. 22 shows the generator in its armed position, that is, in the position in which the plates 103 are bent (towards the left as viewed in FIG. 22) under the effect of thrust means (not shown) applied against the magnet 101. The latter is therefore biased towards the right in passing through the position of rest. As soon as the thrust on the movable magnet ceases, the latter moves suddenly towards the right owing to the elasticity of the plates 103. The conductors 107 and 108 are then moved in the magnetic field and consequently an electromotive field is generated at the terminals of the solenoid constituted by the conductors. The magnet 101 is therefore subjected to a to-and-fro movement which continues until the kinetic energy initially stored has been completely absorbed.

It will be observed that the heights $h_1$ and $h_2$ of the magnetic sheets 106a and 106b have given values which allow a free movement of the movable magnet 101 relative to the fixed magnet and a certain bending of the plates 103. The air-gap between the plates must not be less than the greatest vertical movement of the movable magnet.

Another embodiment of the invention is shown in FIG. 24 in which the electric generator is provided with a step-up transformer fitted around the generator. It comprises, in particular, a sleeve of insulating material 109 adhered to the fixed magnet 101, the movable magnet 102 remaining however entirely free to move in the longitudinal direction. Wound around this sleeve 109 is the primary winding 110 of the transformer. The primary winding is insulated from the secondary winding 111 by an insulating sleeve 112, the assembly being completed by a protective sleeve 113.

The primary winding 110 is connected to the terminals of the end plates 114–115 of the generator, the output of the generator being constituted by the terminals 116, 117 of the secondary winding 111. In this way, it is possible to obtain an electromotive output force of considerable magnitude.

If this electric generator is employed for generating sparks, it is advantageous to provide in the vicinity of the electrodes between which the spark is created a small piece of radioactive material such as for example americium which contributes to ionize the atmosphere between the electrodes.

Although specific embodiments of the invention have been described, many modifications and changes may be made therein without departing from the scope of the invention as defined in the appended claims.

Having now described our invention what we claim as new and desire to secure by Letters Patent is:

1. An electric generator comprising means defining a magnetic circuit having two parts, at least one of said parts comprising a permanent magnet, a solenoid in the form of an elastically yieldable element respectively rigid with each of said two parts so as to allow elastically yielded relative movement of said parts, said solenoid being located in the field created by said permanent magnet, whereby electric energy can be taken from the ends of said solenoid.

2. A generator as claimed in claim 1, wherein said elastically yieldable element is a helical spring.

3. A generator as claimed in claim 2, wherein each of said parts comprises a permanent magnet, said two magnets being so disposed relative to each other as to create a magnetic field in the space defined thereby, said spring being placed in said space, and a core having a high-permeability disposed in said spring.

4. A generator as claimed in claim 3, wherein said magnets are semi-cylindrical and surround said spring which has a roughly oval cross-section, the magnets having magnetic poles located on their generatrices.

5. A generator as claimed in claim 1, wherein said elastically yieldable element comprises stacks of elastically yieldable laminations constituting turns, said stacks being interconnected so as to form a solenoid.

6. A generator as claimed in claim 5, wherein one of said parts is a magnet having a U-shape and comprising in the extension of each pole a plurality of said stacks, the magnetic circuit thus formed being completed by a frame forming the other of said two parts so that a displacement of the frame oscillates said stacks in the magnetic field of said magnet.

7. A generator as claimed in claim 1, wherein each of said parts comprises a magnet, said magnets being cylindrical and having annular poles and centre poles of opposite polarities, said elastically yieldable element being a helical coil spring having a rectangular cross-section forming a ring and being placed between the annular poles.

8. A generator as claimed in claim 1, wherein each of said parts comprises a magnet, said magnets being cylindrical and coaxial and the elastically yieldable element comprises a plurality of helical coil springs interconnecting the two magnets and having an axis parallel to the magnets.

9. A generator as claimed in claim 1, in combination with a derivative circuit having a resistance, a capacitance and an amplifier.

10. A generator as claimed in claim 1, wherein said elastically yieldable element is constituted by a series of plates of elastically yieldable material in parallel relation to each other in the field of said magnet, each of said plates comprising on at least one of the faces thereof a printed conductor in the form of a spiral, the conductors thus formed on the series of plates and wound in the same direction being interconnected in series so as to form a solenoid.

11. A generator as claimed in claim 10, wherein said plates are of plastics material.

12. A generator as claimed in claim 10, wherein a spiral conductor is provided on each of the faces of each plate, said spiral conductors being wound in the same direction and interconnected in series.

13. A generator as claimed in claim 10, wherein each of said parts comprises a permanent magnet so disposed as to form a magnet field in the space defined between it and the other magnet, said plates are rectangular and each has a centre opening, pairs of sheets of magnetic material located in the same plane being in alternating relation to the plates, the sheets having a width less than that of said opening, one of the sheets of each pair of sheets being secured to the first magnet whereas the other pair is connected to the other magnet.

14. A generator as claimed in claim 1, combined with a step-up transformer which encompasses the generator.

References Cited
UNITED STATES PATENTS 1,270,920    7/1918    Botz.
3,287,696   11/1966    Cholet et al. _____ 310—15 XR MILTON O. HIRSHFIELD, Primary Examiner B. A. REYNOLDS, Assistant Examiner U.S. Cl. X.R.

128—382; 290—1; 310—27, 268